J. Rand,
Metal Rolls for Paint.
Nº 2,252. Patented Sep. 11, 1841.
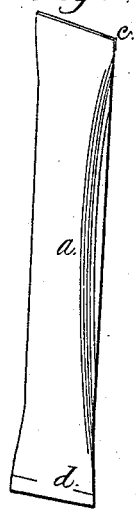
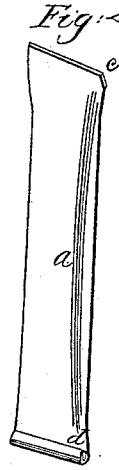
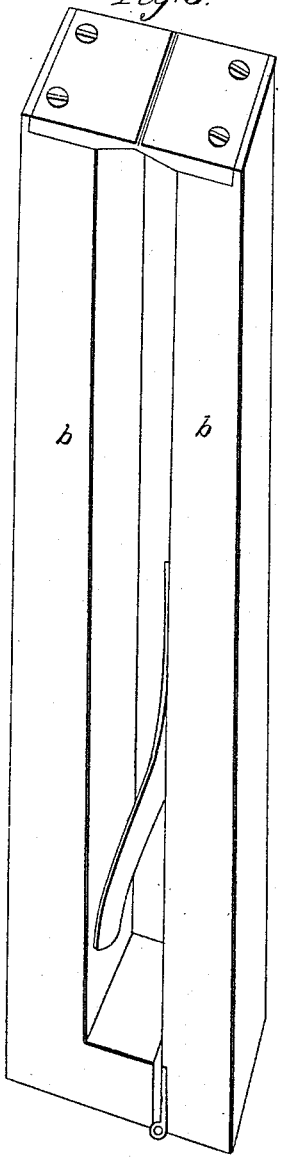
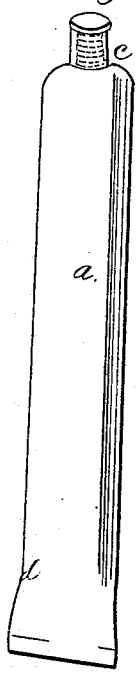
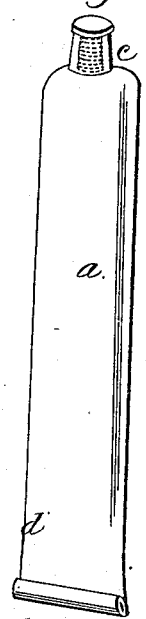
Witnesses:
Inventor:
John Rand

UNITED STATES PATENT OFFICE.

JOHN RAND, OF HOWLAND STREET, COUNTY OF MIDDLESEX, ENGLAND.

IMPROVEMENT IN THE CONSTRUCTION OF VESSELS OR APPARATUS FOR PRESERVING PAINT, &c.

Specification forming part of Letters Patent No. 2,252, dated September 11, 1841.

*To all whom it may concern:*

Be it known that I, JOHN RAND, a citizen of the United States of America, and now residing at Howland Street, Middlesex, in the Kingdom of Great Britain, gentleman, have invented or discovered new and useful improvements in Preserving Paints and other Fluids; and I, the said JOHN RAND, do hereby declare the nature of my invention and the manner in which the same is to be performed are fully described and ascertained in and by the following statement thereof, reference being had to the drawings hereunto annexed, and to the figures and letters marked thereon—that is to say:

My invention relates to a mode of preserving paints and other fluids by confining them in close metallic vessels so constructed as to collapse with slight pressure, and thus force out the paint or fluid confined therein through proper openings for that purpose, and which openings may be afterward closed air-tight, and thus prevent the paint or other fluid remaining in the vessel from being injuriously acted on by the atmosphere. The vessels so employed being at all times full, whatever be the quantity of fluid matter remaining therein, in consequence of the vessels being caused to collapse in the act of removing any quantity of the contained fluid, the vessels may therefore be said to be progressively reduced in capacity, and the previous extent of capacity closed up in proportion to the quantity of paint or other contained fluid removed, the remaining capacity being at all times full, to the exclusion of the atmosphere, as will be more fully described hereinafter when I come to describe practical means of performong my invention; and it should be understood that my invention is intended to apply to paints in a fluid or liquid state, and to vehicles and to pigments for paints in a fluid state, and to varnishes, and to other fluids which, being kept in vessels and being used from time to time, require the vessels containing them to remain full and to be closed air-tight after removing portions of the fluids; and care should be observed in using this my invention that the fluids so placed in metallic vessels should not be such as to be chemically prejudicially acted on by the metal employed, and that the fluid should not injuriously act on the metal vessels used.

Having thus generally stated the nature and, object of the invention, I will proceed to explain in a more practical manner the best means I am acquainted with for performing the same.

The metals which I believe are best and cheapest for the purposes of my invention are grain-tin, lead, and pewter, and in making the proper vessels therefrom the metal is to be of such thickness as readily to yield to pressure and to be caused to be permanently collapsed; and although the shapes of the vessels may be varied, I believe the most convenient shape to be cylindrical. I will therefore confine my description to that shaped vessel.

In the drawings, Figure 1 represents a vessel containing paint, and is of a suitable size for containing artist's colors. The vessel *a* is made of grain-tin drawn into a tube, as is well understood, the metal being about one seventy-fifth of an inch in thickness, the ends being closed by melting the edges of the metal when pressed together, or by soldering. In filling such vessel, one end is first closed and the paint or other fluid requiring to be similarly preserved is filled in. The edges of the other end are then pressed together and closed by melting the edges of the metal or by soldering. Such closing of the ends of the metal vessels may be conveniently performed by means of the instrument *b,* Fig. 3, which consists of a pair of forceps, the chaps of which being closed on the end of the tube or vessel *a* leave a groove or hollow between the chaps, by means of which any person, by the aid of a blow-pipe or hot iron, may close the end of the vessel *a* by melting the edges of the metal of which the vessel is composed, or by adding a small quantity of solder into the groove.

In removing paint or other preserved fluid from a vessel, *a,* a hole may be made at *c,* and by pressing the vessel *a* the fluid contained will flow from the opening *c,* and it is better that the pressure should be made at the end, *d,* of the vessel *a,* so as progressively to drive away the paint or other fluid therefrom and completely to collapse the end *d* as the fluid is removed, and when collapsed the end *d* may be rolled up, as shown at Fig. 2, and the person using the fluid from time to time from the vessel *a* may close the opening at *c* and render it air-tight by the the aid of the instrument *b,* and by melting the metal at the edges or by solder, as above described, and even by simply pressing the edges together and folding the end a tight joint may be produced; but I recommend the other means of closing in preference when the vessels are to be conveyed from place to place.

Fig. 4 shows another arrangement of vessel $a$, there being a short tube affixed to the end $c$, of the vessel $a$, such tube having a screw-cap, as is shown, by which means the fluid contained can be from time to time removed and the end $c$ closed air-tight by the cap.

Fig. 5 shows a similar vessel to that at Fig. 4, from which a part of the fluid has been removed and the end $d$ collapsed.

In making longer vessels, the metal will require to be somewhat thicker, but always observing that the thickness must be such as to allow of the fluid contained therein to be removed by collapsing the vessel or part thereof from time to time, as portions of the fluid are removed; and they are to be formed in such manner as to be readily rendered air-tight at the opening through which the fluid is removed; and although a drawn tube is a convenient form for the metal to be made into yet it will be evident that proper vessels, $a$, may be made of sheet metal, the edges being joined by soldering or by melting the edges of the metal. I wish it therefore to be understood that I do not confine myself to the means of forming such vessels $a$, so long as they are suitable for carrying out my invention as herein described, nor do I confine myself to the shapes herein shown and described; but

What I claim is—

The mode herein explained of preserving paint and other fluids in close vessels, so formed as to allow of portions of such fluid being from time to time withdrawn and the space previously occupied filled up by the collapsing of such vessels (or part thereof) by slight pressure, and the openings closed from time to time, as above described.

JOHN RAND.

Witnesses:
 W. H. RITCHIE,
 V. CARPMAEL.